Aug. 29, 1950
P. NILAKANTAN
2,520,428
CENTER OF GRAVITY CALCULATOR
Filed Sept. 23, 1946
FIG. 1.
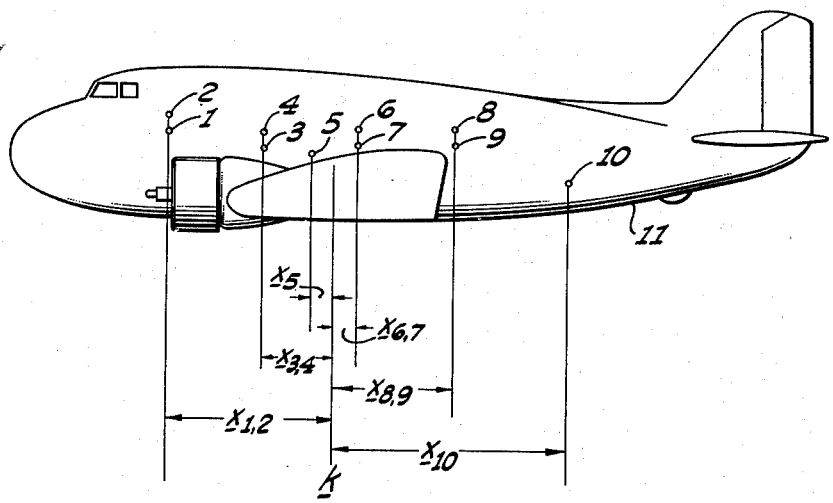
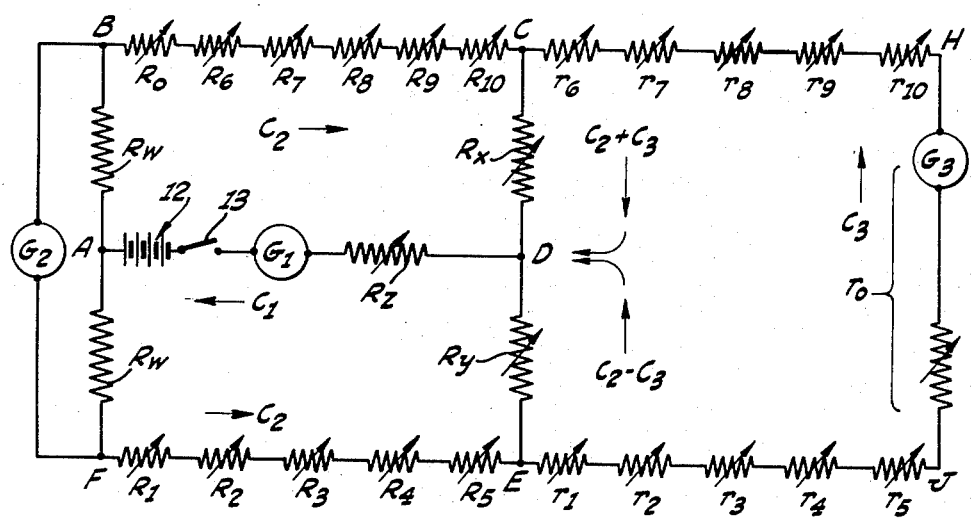
FIG. 2.
PARAMESWAR NILAKANTAN,
INVENTOR
BY
ATTORNEY

Patented Aug. 29, 1950

2,520,428

UNITED STATES PATENT OFFICE 2,520,428

CENTER OF GRAVITY CALCULATOR

Parameswar Nilakantan, New Delhi, India

Application September 23, 1946, Serial No. 698,616

3 Claims. (Cl. 235—61)

My invention relates generally to calculators for locating the center of gravity of loaded aircraft and more particularly to devices of this nature which employ an impedance network in which the values of the impedance elements represent the values of elements of a dynamic system such as a loaded aircraft with various disposable load items therein.

Previous calculators for this purpose have been designed but have usually been the equivalent of simplified mechanical scale models of the craft, in which miniature weights or springs are used to represent the various load items in the craft.

It is well known that the location of the center of gravity is of extreme importance in maintaining level and efficient flight of a loaded aircraft. It is desirable, furthermore, to be able to predetermine the location of the center of gravity without having to load the plane first. Heavy duty weighing scales have in the past been employed to measure the downward thrust at each of the members of the landing gear of a loaded airplane on the ground. From such measurements it is a simple problem to calculate the center of gravity position. This method has, however, several distinct disadvantages. For one thing, it is cumbersome, time-consuming, and not particularly accurate. Furthermore, if the position of center of gravity is found to be unsatisfactory, the load must be rearranged to shift the center of gravity to a suitable position. Still further, if, as has been done, the weighing devices are attached to the plane itself, they add useless weight, and if they break down, render a determination of the center of gravity position on that particular plane impossible until repairs have been made.

Bearing in mind the previous efforts to provide suitable apparatus of this type, and bearing in mind the deficiencies therein, it is a major object of my invention to provide apparatus of the class described which is self-contained and can be operated on the ground at a point remote from the craft for which calculation is to be made.

It is another object to provide such apparatus which is direct reading.

It is still another object to provide such apparatus which is readily adapted for use in connection with craft of various sizes, models, and capacities.

Briefly my invention contemplates the use of an electrical bridge network in which the elements of the bridge have electrical values which are proportional to, and therefore represent the dynamic elements of the balance system of static torques acting on an aircraft in flight, or for that matter, on any loaded craft.

The position, in a horizontal plane, of the center of gravity of an aircraft in level flight may be determined from the following equation: Let $\bar{x}$=the vector distance of the center of gravity from a datum point.

$$\bar{x} = \frac{\sum_{i=0}^{i=n} W_i X_i}{\sum_{i=0}^{i=n} W_i} = \frac{\sum_{i=0}^{i=n} M_i}{\sum_{i=0}^{i=n} W_i}$$

where $w_i$ is the weight of a load item $i$, $n$ is the number of items, $x_i$ is the corresponding moment arm measured from the datum point, and $m_i$ is the corresponding moment.

The general object then of the present invention is to substitute an electrical network for the above-mentioned system of forces, which network shall have electrical or electronic elements each corresponding in value to one of the dynamic elements in the system of static torque, e. g., moments and weights.

While various electronic elements such as capacitors, inductances, etc., may be employed to represent the dynamic elements, I have found it convenient to substitute voltages for moments, resistances for weights, and currents for distances or moment arms. Thus the analogy of equations is between Ohm's law, $E=IR$, and the law of moment, $M=DF$ where D is the moment arm and F a force acting thereon. It is obvious that when applied to the present problem involving center of gravity, all forces are weights, and hence vertical in direction, and all moment arms are therefore horizontal.

The analogy in the present instance may be further envisioned by considering a voltage proportional to the algebraic sum of the moments of a dynamic system, as applied across a resistance proportional to the algebraic sum of the weights acting on the system. The resulting current flowing in the resistance will then be proportional to the horizontal distance of the center of gravity from the datum point of the system around which the moments were taken.

For a detailed description of an electrical circuit meeting the above conditions, reference should now be had to the attached drawings illustrating my invention and the mode of its operation wherein:

Fig. 1 is a side elevational view of an airplane in flight with various load items indicated thereon; and Fig. 2 is a circuit diagram illustrating a resistance network such as may be employed in calculating the position of the center of gravity of the airplane shown in Fig. 1.

In the drawings, the numbers 1 through 10 indicate the location of ten disposable load items in the airplane depicted in Fig. 1. The letter $k$ in Fig. 1 indicates a datum point which in the present instance has been selected to correspond to the center of gravity of the airplane when empty. The horizontal distances of each load item are indicated by dimensions $x$ each having a subscript corresponding to the load item to which it refers. Distances forward of $k$ are to be considered as negative since weight applied forward of $k$ produces counter-clockwise moment. For purposes of the present illustration load items 1 and 2 may be considered as the pilot and co-pilot, items 3, 4, and 6, 7, 8 and 9 as passengers, 5 as fuel, and 10 as cargo. The weight of the various items will be referred to by the letter $w$ with a subscript corresponding to the number of the item referred to.

From the foregoing discussion and by reference to the equation above given, it will be seen that the position of the center of gravity relative to point $k$ in the loaded airplane in Fig. 1 is equal to the algebraic sum of the quantities $x_1w_1 + x_2w_2 \ldots x_{10}w_{10}$ divided by the total weight of the load items and the empty plane. It should be noted that since the weight $w_0$ of the empty plane is applied at the datum point, its moment is equal to zero.

If the various weights and positions of their application are known then the center of gravity position can of course be calculated, but as such calculation is time consuming and subject to human error, it is desirable to obtain the results quickly and automatically and by means of a calculator which is direct reading.

The circuit

An electric circuit for solving the equation given above is illustrated in Fig. 2. In the circuit diagram, the junctures have been identified by the letters A, B, C, D, E, F, H, and J for reference hereinafter. Currents $c_1$, $c_2$, $c_3$, have also been indicated adjacent the circuit branches through which they flow. The circuit comprises a number of moment representing resistors, $R_0$, $R_1$, $R_2$, ... $R_{10}$; weight representing resistors $r_0$, $r_1$, $r_2$, ... $r_{10}$; circuit balancing resistors $R_w$, $R_x$, $R_y$, and current limiting resistor $R_z$; galvanometers $G_1$, $G_2$, and $G_3$; a battery 12; and a switch 13. The two resistors $R_0$ and $r_0$ are also included and represent the moment and weight respectively of the empty plane. It is to be noted that $r_0$ includes the resistance of the galvanometer $G_3$. Each of the resistors $R_0 \ldots 10$ and $r_0 \ldots 10$ is variable between zero and a maximum value proportional to the maximum weight or moment it represents. A convenient ratio between dynamic and electric elements has been selected as: 1 ohm of R or $r = 1000$ inch-pounds or 10 pounds respectively.

The galvanometer $G_3$ is a zero center ammeter capable of indicating on the order of plus or minus 3 ma. and, as will be hereinafter described, indicates the position of the loaded center of gravity directly in inches forward or aft of the point K. $G_1$ is a milliammeter capable of indicating on the order of 3 ma. and $G_2$ is a current null indicator preferably provided with a removable shunt as is customary in such instruments. The battery 12 has a voltage on the order of 2 volts. The resistors $R_w$ are equal and have a value in the order of 10 ohms. $R_x$, $R_y$, and $R_z$ have values in the order of 50 ohms, and are variable.

Operation

To operate the calculator, the moment and load resistors are each set to values proportional to the dynamic quantity they represent. If any load item is to be omitted the corresponding resistor is set at zero. If any moment arm is equal to zero the corresponding resistor is set at zero. Accordingly, since the datum point is at the center of gravity of the empty airplane, the moment arm of the empty airplane is equal to zero, and the resistor $R_0$ is set to zero. The weight of the empty plane still enters into the calculation however, and hence resistor $r_0$ is set to correspond thereto. For convenience in setting, the resistors may be calibrated directly in units of the quantity they represent, for example, the weight resistors $r_0 \ldots 10$ pounds and the moment resistors $R_0 \ldots 10$ inch-pounds. As an additional convenience the moment resistor may also have scale calibrations in weight units alone, since generally speaking each load item will be applied always at the same point in the airplane and hence the moment arm is not a variable.

Having adjusted the moment and weight resistors, the switch 13 is closed and the balancing resistors $R_x$ and $R_y$ adjusted until a null is indicated by the galvanometer $G_2$. The current limiting resistor $R_z$ is then adjusted until a predetermined current, as indicated by the galvanometer $G_1$, flows in arm AD of the circuit. The value of this predetermined current is a circuit constant as will be pointed out later in the description.

The position of the center of gravity in inches forward or aft of the point $k$ is now read directly from the galvanometer $G_3$.

Theory of operation

Referring to the analogy stated earlier in the specification it will be remembered that the purpose of the circuit is to apply a voltage proportional to the algebraic sum of the moments, across a resistance proportional to the algebraic sum of the weights. It will be seen from an examination of Fig. 2 that the resistance of the circuit branch CHJE is equal to the sum of resistors $r_0 + r_1 \ldots + r_{10}$, and hence is proportional to the algebraic sum of the weight $W_0 + W_1 \ldots + W_2 \ldots + W_{10}$. Following the analogy then, the remainder of the circuit element must serve to apply across junctures CE, a voltage equal to the algebraic sum of the moments whereupon the current through galvanometer $G_3$ will be proportional to the distance of the center of gravity from the datum point $k$. Consideration of the following discussion will show that this is accomplished:

When the resistors $R_x$ and $R_y$ are adjusted as described to produce a null in the galvanometer $G_2$, two conditions obviously obtain:

1. The potential at the junctures B and F are identical; and
2. The currents $C_2$ are equal in the branches ABCD and AFED.

Since equal currents flow through all the moment resistors $R_0$, $R_1$, etc., the potential drop across each will be proportional to the resistance values thereof. As will be seen from the direction of the current arrows $c_2$, the potential at the juncture B will be higher than that at C; and at the juncture E, lower than at the juncture F.

Thus the potential difference or voltage between junctures C and E is proportional to the algebraic sum of the voltage drop across the resistors $R_0 \ldots _{10}$, and hence is proportional to the algebraic sum of the resistances thereof, and Q. E. D., the voltage across juncture CE is proportional to the algebraic sum of moments as desired. It will be noted that moments applied forward of point $k$ are represented by resistance in the branch FE of the circuit and moments applied aft of point $k$ are represented by resistance in the branch BC.

Obviously, if the algebraic sum of the moments about the point $k$ were zero, then the displacement of the center of gravity would be zero, which would be indicated by the fact that no current would flow in the galvanometer $G_3$. This is true in the circuit since, if the total resistance of resistors $R_1 + R_2 \ldots R_5$ were equal to the total resistance of $R_0 + R_6 + R_7 \ldots R_{10}$, then no potential difference exists between the junctures C and E. Further, if weight is then added aft, for example, cargo at 10, then resistance $R_{10}$ is increased and the potential at the juncture C becomes less than at the juncture E. This results in current flow in the direction indicated by the arrow $c_3$. Conversely the addition of fuel at 5 (forward of K) increases the resistance of the circuit branch FE, and the current flow through the galvanometer $G_3$ is in a direction opposite to the arrow $c_3$. Thus it will be seen that since a voltage proportional to the algebraic sum of the moments is applied across a resistance proportional to the algebraic sum of the weights, the value of the current through this resistance, i. e., that indicated by the galvanometer $G_3$, will be proportional to the distance of the center of gravity from the datum point $k$, and that the direction of current flow in galvanometer $G_3$ will indicate the direction (forward or aft) of the center of gravity from the datum point $k$.

As has been previously stated, the current through the galvanometer $G_1$ is a circuit constant. This is true since the currents $c_2$ flowing through the circuit branches BC and FE are equal to one-half of the current $c_1$ through the branch DA and must be constant to effect the desired potential voltage drop across the moment resistors $R_0 \ldots R_{10}$. Accordingly, the galvanometer $G_1$ may, if desired, be provided with a single scale division to indicate the proper setting of the current limiting resistor $R_z$.

As has been noted, the resistance $r_0$ includes the resistance of the galvanometer $G_3$, and hence can never be adjusted to zero. This range of adjustment is never necessary, however, since $r_0$ represents the weight of airplane and hence will always have a finite positive value.

The impedance elements of the circuit illustrated in Fig. 2 are all direct current resistors and the power source is the battery. These resistors, however, may be replaced by other impedance elements such as for example, condensers or chokes, and by appropriate circuit modification, well known in the art, an alternating current generator can be used in place of the battery.

It is obvious furthermore that the circuit disclosed herein may, with little or no modification, be used to solve any equation of the general form wherein $y = f(x \text{ and } z)$ and where $x$ and $y$ are physical quantities and $z$ is a product of $x$ and $y$. The circuit shown herein, while subject to modification within the spirit of the invention is fully capable of achieving the objects and providing the advantages hereinbefore stated. Therefore, I do not mean to be limited to the form shown and described herein, but rather to the scope of the appended claims.

I claim:

1. In an electrical calculator for solving a dynamic equation, the combination of: a plurality of electric impedance elements each adapted to have an impedance value proportional to one of a system of weights represented by said equation, said elements being connected in a circuit branch between two juncture points in a manner to produce between said points a total impedance proportional to the sum of said weights; a plurality of impedances each adapted to have a value proportional to a positive moment acting on said system, said positive moment impedances being connected between one of said two points and a third point; a plurality of impedances each adapted to have a value proportional to a negative moment acting on said system, said negative moment impedances being connected between the other of said first mentioned two points and a fourth point; circuit means including a plurality of balancing impedances to pass equal currents through said moment impedances while maintaining zero potential between said third and fourth points, said last circuit means being adapted and connected between said first two and third and fourth points in a manner to effect between said first two points, a voltage equal to the algebraic sum of the voltage drops across said moment impedances; and detecting means responsive to current flow in said circuit branch adapted to indicate a distance proportional to the value thereof whereby to solve said equation in terms of distance.

2. In an electrical calculator for solving dynamic equations, the combination of: adjustable impedance means to produce an electrical impedance in a circuit branch, the value of said impedance being proportional to the sum of a plurality of weights acting on a loaded craft; impedance means connected in a second circuit branch between one of said two points and a third juncture point adapted to produce an impedance therebetween proportional to the sum of positive moments about a datum point and acting on said craft by reason of said weights; other impedance means connected in a third circuit branch between the other of said first two points and a fourth juncture point, adapted to produce an impedance therebetween proportional to the sum of the negative moments about said datum point and acting on said craft; a source of electrical power including current adjusting means operatively connected thereto; a pair of fixed impedance elements of equal value each having one terminal thereof connected to the same terminal of said power source, one of said pair of elements having its other terminal connected to said third juncture point and the other element having its other terminal connected to said fourth juncture point; a pair of adjustable impedance elements each connected between the other terminal of said power source and one of said first two points respectively, whereby to furnish a return path for current flowing from said source, through said fixed elements, through said second and third branches to said first two points, said adjustable elements being adapted to equalize said current, means operatively associated with said power source to indicate the value of current thereof; a null indicator connected between said third and fourth points adapted to indicate zero potential therebetween; and indicating means responsive to current in said first circuit branch adapted to indicate the vector value proportional to current therein whereby, when said pair of adjustable elements are adjusted to produce said zero potential as indicated by said null indicator, and said current adjusting means is adjusted to effect predetermined currents between said second and third branches, the voltage between said first two points is proportional to the algebraic sum of moments acting on said craft and the current in said first branch is propotional to and hence index of the position of the center of gravity of said loaded craft.

3. In an electrical calculator for solving a dynamic equation, the combination of: first resistor means connected between two juncture points and adapted to produce therebetween a resistance proportional to the sum of a system of weights represented in said equation; second resistor means connected between one of said points and a third juncture point, said second resistor means being adapted to produce a resistance proportional to the sum of positive moments about a datum point and acting on said system; third resistor means connected between the other of said first two points and a fourth juncture point, said third resistor means being adapted to produce a resistance proportional to the sum of negative moments about said datum point and acting on said system; current source means adjustable to produce a predetermined current; current dividing means adapted to divide current from said source means into two secondary currents and pass the same through said second and third resistor means respectively, said dividing means being further adapted to produce equal resistance between said source means and said third and fourth points respectively; a pair of balancing resistors having common connection to said source means and each connected to one of said first two points whereby said balancing resistors are adapted to equalize said secondary currents through said second and third resistor means; and null indicating means operatively associated with said dividing means whereby to indicate equality of said secondary currents; and detecting means responsive to current through said first resistor means adapted to indicate a value proportional to the current therein whereby to solve said equation in terms of distance.

PARAMESWAR NILAKANTAN.

REFERENCES CITED

The following references are of record in the file of this patent:

UNITED STATES PATENTS

| Number | Name | Date |
|---|---|---|
| 1,893,009 | Ward | Jan. 3, 1933 |
| 2,373,504 | Schlieben et al. | Apr. 10, 1945 |
| 2,443,098 | Dean | June 8, 1948 |